(No Model.)

J. M. EIRICH.
APPARATUS FOR WATERING STOCK.

No. 258,036. Patented May 16, 1882.

WITNESSES

INVENTOR

UNITED STATES PATENT OFFICE.

JOHN MARTIN EIRICH, OF MARYSVILLE, OHIO.

APPARATUS FOR WATERING STOCK.

SPECIFICATION forming part of Letters Patent No. 258,036, dated May 16, 1882.

Application filed February 1, 1882. (No model.)

*To all whom it may concern:*

Be it known that I, JOHN MARTIN EIRICH, a citizen of the United States, residing at Marysville, in the county of Union and State of Ohio, have invented certain new and useful Improvements in Apparatus for Watering Stock; and I do hereby declare the following to be a full, clear, and exact description of the invention, such as will enable others skilled in the art to which it appertains to make and use the same.

My invention relates to certain new and useful improvements in apparatus for watering stock; and the invention has for its object the production of automatic means whereby the trough or receiver can be filled to a certain height and will not overflow, and also keeping water from freezing in cold weather and keeping water cooler in summer; and to this end the invention consists in novel features of construction and combination and arrangement of parts, all as will be hereinafter fully described, and specifically designated in the claim.

Figure 1:
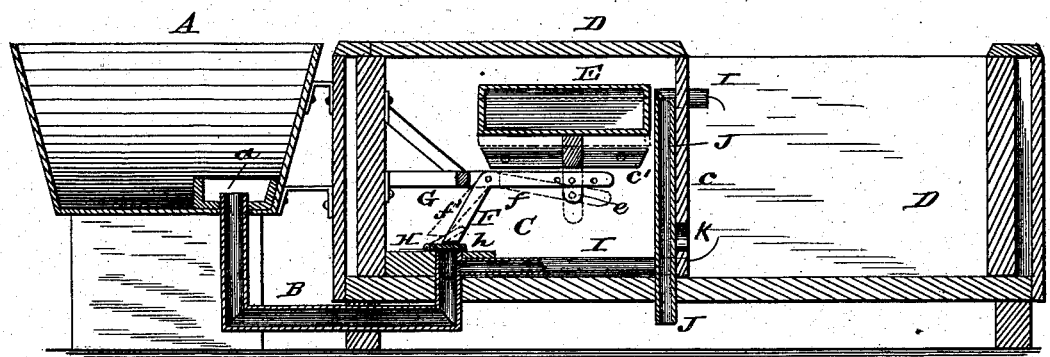
Figure 2:
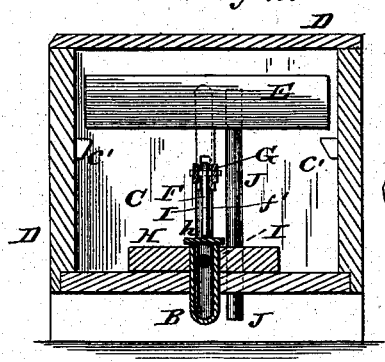
Figure 3:
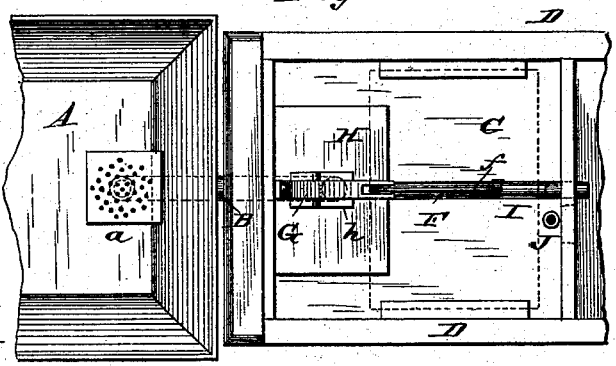

Referring to the accompanying drawings, Figure 1 represents a longitudinal vertical section through my improved apparatus. Fig. 2 is a transverse section thereof, and Fig. 3 is a top or plan view of the same.

In the drawings, A represents an artificial cistern or reservoir, into which the water will flow from any natural source by gravitation; or it may be a well or fountain, from which a limited flow of water may be obtained by connecting a pipe, B, with it that leads to a lower level. The other end of the pipe is connected with the valve-chamber C, forming a part of a receiver, D, arranged at any desired point below the elevation of the cistern or reservoir A.

E represents a float, provided on its lower side with a forked arm, e, to which is pivoted the long arm f of an elbow-lever, F, which is pivoted at its elbow or bent joint to a bracket, G, projecting from the side of the receiving valve-chamber C. The short arm f' of the elbow-lever F is adapted to engage with the top of the valve h, pivoted to a block, H, and covering the open end of the supply-pipe B, which passes up through said block. The float E is so arranged that when the receiver is filled to a suitable height the float will rise, thus bringing the short arm f' of the elbow-lever F down onto the top of the valve h, and pressing it down on the open end of the pipe, and thereby stopping the flow of water from said pipe, except as hereinafter mentioned, and thereby preventing the overflow of the receiver.

I represents a small pipe, connecting with supply-pipe B below the valve h, and passing up to near the top of the division-board c, and thence through it into the receiver D. This pipe is for the purpose of furnishing a constant small stream of water into the receiver or trough near the top, thereby keeping surface of water from freezing in cold weather, and also keeping water cooler in summer.

J is an overflow-pipe, extending up through bottom of valve-chamber and to the height of the discharge-opening in pipe I, which latter pipe is of the same diameter as pipe J, and thus provides only the necessary supply of water which may be carried off by the overflow-pipe, as the float-valve will close or shut off the supply of water through main pipe B when the water has risen up to near the top of receiver. As the water is taken from the receiver the valve h will be opened by the pressure of water through the pipe B, as the float will fall when water is taken from the receiver, thus throwing the short arm out of engagement with the valve, as shown in dotted lines, Fig. 1.

The reservoir or cistern A is supplied with a suitable filter, a, at the point where pipe B enters it.

The division-board c is provided with a large opening, K, through it to form a free communication between the valve-chamber and receiver, and the valve-chamber is provided on the sides with suitable stops, c' c', to prevent the float-valve from dropping down too low in its chamber.

Having thus fully described my invention, what I claim as new, and desire to secure by Letters Patent, is—

In an apparatus for watering stock, the combination, with the reservoir or cistern A, supply-pipe B, and pivoted valve h, and receiver D, having valve-chamber C, of the float-valve E and pivoted bell-crank lever F, arranged in said chamber C and pivotally connected at one end to said float, and its free end adapted to engage said valve h for closing it, substantially as and for the purpose herein shown and described.

In testimony whereof I affix my signature in presence of two witnesses.

JOHN MARTIN EIRICH.

Witnesses:
JAMES W. ROBINSON,
LEONIDAS PIPER.